United States Patent
Fu

(10) Patent No.: US 9,362,846 B2
(45) Date of Patent: Jun. 7, 2016

(54) SOFT SWITCHING INVERTER WITH AUXILIARY SWITCH FACILITATING ZERO VOLTAGE SWITCHING

(71) Applicant: FutureWei Technologies, Inc., Plano, TX (US)

(72) Inventor: Dianbo Fu, Plano, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 233 days.

(21) Appl. No.: 14/189,606

(22) Filed: Feb. 25, 2014

(65) Prior Publication Data

US 2015/0244284 A1  Aug. 27, 2015

(51) Int. Cl.
| | |
|---|---|
| *H02M 7/53* | (2006.01) |
| *H02M 7/537* | (2006.01) |
| *H02M 1/12* | (2006.01) |
| *H02M 7/48* | (2007.01) |
| *H02M 1/00* | (2006.01) |

(52) U.S. Cl.
CPC .............. *H02M 7/537* (2013.01); *H02M 1/126* (2013.01); *H02M 2001/0058* (2013.01); *H02M 2007/4811* (2013.01); *H02M 2007/4815* (2013.01); *Y02B 70/1491* (2013.01)

(58) Field of Classification Search
CPC ............. H02M 2007/4815; H02M 2001/0058; H02M 7/5383; H02M 2007/4811; H02M 2007/4822; H02M 7/53832; H02M 7/53835; H02M 7/53
See application file for complete search history.

(56) References Cited

U.S. PATENT DOCUMENTS

| | | | |
|---|---|---|---|
| 5,572,418 A | 11/1996 | Kimura et al. | |
| 2010/0246231 A1* | 9/2010 | Sirio | H02M 3/1588 363/132 |
| 2012/0057387 A1* | 3/2012 | Lai | H02M 7/797 363/132 |
| 2012/0187879 A1* | 7/2012 | Galea | H02M 7/5387 318/400.29 |
| 2012/0218785 A1 | 8/2012 | Li et al. | |

FOREIGN PATENT DOCUMENTS

CN           102594191 A       7/2012

OTHER PUBLICATIONS

International Search Report of Patent Cooperation Treaty (PCT), International Application No. PCT/CN2015/070055, Applicant Huawei Technologies Co., Ltd., date of mailing Mar. 24, 2015, 11 pages.

Yu, W., et al., "An Improved Zero-Voltage-Switching Inverter Using Two Coupled Magnetics in One Resonant Pole," IEEE Transactions on Power Electronics, vol. 25, No. 4, Apr. 2010, 10 pages.

* cited by examiner

*Primary Examiner* — Harry Behm
(74) *Attorney, Agent, or Firm* — Futurewei Technologies, Inc.

(57) ABSTRACT

An inverter comprises a first switch coupled to an input of an output filter and a positive dc bus, a second switch coupled to the input of the output filter and a negative dc bus, a transformer coupled to a common node of the first switch and the second switch, a first freewheeling apparatus and a first soft switching switch connected in series, wherein the first soft switching switch is configured such that the first switch is of a first zero voltage transition during a turn-on process of the first switch and a second freewheeling apparatus and a second soft switching switch connected in series, wherein the second soft switching switch is configured such that the second switch is of a second zero voltage transition during a turn-on process of the second switch.

21 Claims, 11 Drawing Sheets

SOFT SWITCHING INVERTER WITH AUXILIARY SWITCH FACILITATING ZERO VOLTAGE SWITCHING

TECHNICAL FIELD

The present invention relates to an inverter device and method, and, in particular embodiments, to a soft switching inverter and method.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a dc/dc converter so as to achieve a regulated output voltage at the output of the dc/dc converter. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

Since the majority of applications may be designed to run on 120 volts ac power, a solar inverter is employed to convert the variable dc output of the photovoltaic modules to a 120 volts ac power source. A plurality of inverter topologies may be employed to achieve high power as well as high efficiency conversion from solar energy to utility electricity. In particular, a high power ac output can be achieved by using a series of power semiconductor switches to convert a plurality of low voltage dc sources to a high power ac output by synthesizing a staircase voltage waveform.

In solar applications, three-level inverters and five-level inverters are widely employed to achieve high efficiency and low total harmonic distortion. Such three-level inverters and five-level inverters are alternatively referred to as multilevel inverters.

In accordance with the topology difference, multilevel inverters may be divided into three categories, namely diode clamped multilevel inverters, flying capacitor multilevel inverters and cascaded H-bridge multilevel inverters. Furthermore, multilevel inverters may employ different pulse width modulation (PWM) techniques such as sinusoidal PWM (SPWM), selective harmonic elimination PWM, space vector modulation and the like. Multilevel inverters are a common power topology for high and medium power applications such as utility interface for renewable power sources, flexible ac transmission systems, medium voltage motor drive systems and the like.

The diode clamped multilevel inverter is commonly referred to as a three-level neutral point clamped (NCP) inverter. A three-level NCP inverter requires two series connected capacitors coupled between the input dc buses. Each capacitor is charged to an equal potential. Furthermore, the three-level NCP inverter may comprise four switching elements and two clamping diodes. The clamping diodes help to reduce the voltage stress on the switching element to one capacitor voltage level.

An NCP inverter utilizes a staircase waveform to generate an ac output. Such a staircase waveform resembles a desired sinusoidal waveform. As a result, the output voltage of the NCP inverter may be of a low total harmonic distortion (THD). In addition, the staircase waveform may reduce the voltage stresses. As a result, the electromagnetic compatibility (EMC) performance of the NCP inverter may be improved. In addition, to achieve the same THD, the NCP inverter may operate at a lower switching frequency. Such a lower switching helps to reduce switching losses so as to achieve an efficient power conversion system.

SUMMARY OF THE INVENTION

These and other problems are generally solved or circumvented, and technical advantages are generally achieved, by preferred embodiments of the present invention which provide an apparatus of soft switching inverters.

In accordance with an embodiment, an inverter comprises a first switch coupled to an input of an output filter and a positive dc bus, a second switch coupled to the input of the output filter and a negative dc bus, a transformer coupled to a common node of the first switch and the second switch, a first freewheeling apparatus and a first soft switching switch connected in series between the positive bus and the negative bus, wherein the first soft switching switch is configured such that the first switch is of a first zero voltage transition during a turn-on process of the first switch and a second freewheeling apparatus and a second soft switching switch connected in series between the positive bus and the negative bus, wherein the second soft switching switch is configured such that the second switch is of a second zero voltage transition during a turn-on process of the second switch.

In accordance with another embodiment, an apparatus comprises a soft switching network coupled to a power converter, wherein the power converter comprises a first switch, a second switch and an output filter formed by an inductor and a capacitor, and wherein the soft switching network comprises a magnetic device, a first auxiliary switch, a second auxiliary switch, a first freewheeling apparatus and a second freewheeling apparatus, and wherein the soft switching network is configured such that the first switch is of zero voltage switching, the second switch is of zero voltage switching, the first auxiliary switch is of zero current switching and the second auxiliary switch is of zero current switching.

In accordance with yet another embodiment, a method comprises providing a soft switching network coupled to a first main switch, a second main switch an output filter of a power converter, wherein the soft switching network comprises a first auxiliary switch, a first freewheeling apparatus connected in series with the first auxiliary switch, a second auxiliary switch, a first freewheeling apparatus connected in series with the first auxiliary switch and a magnetic device coupled to the output filter.

The method further comprises prior to a zero voltage transition of the first main switch, turning on the first auxiliary switch and after the zero voltage transition of the first main switch, turning off the first auxiliary switch.

An advantage of an embodiment of the present invention is that a soft switching network helps to achieve zero voltage switching for the main switch of the inverter and zero current switching for the switching elements in the soft switching network. Such zero voltage switching and zero current switching help to reduce the voltage stresses of an inverter. As a result, the soft switching network helps to improve the efficiency, reliability and cost of the inverter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a soft switching inverter system. The invention may also be applied, however, to a variety of power converters including multilevel inverters, step-up converters, step-down converters and the like. Furthermore, the invention may also be applied to a variety of three-phase inverters. Hereinafter, various embodiments will be explained in detail with reference to the accompanying drawings.

Figure 1:
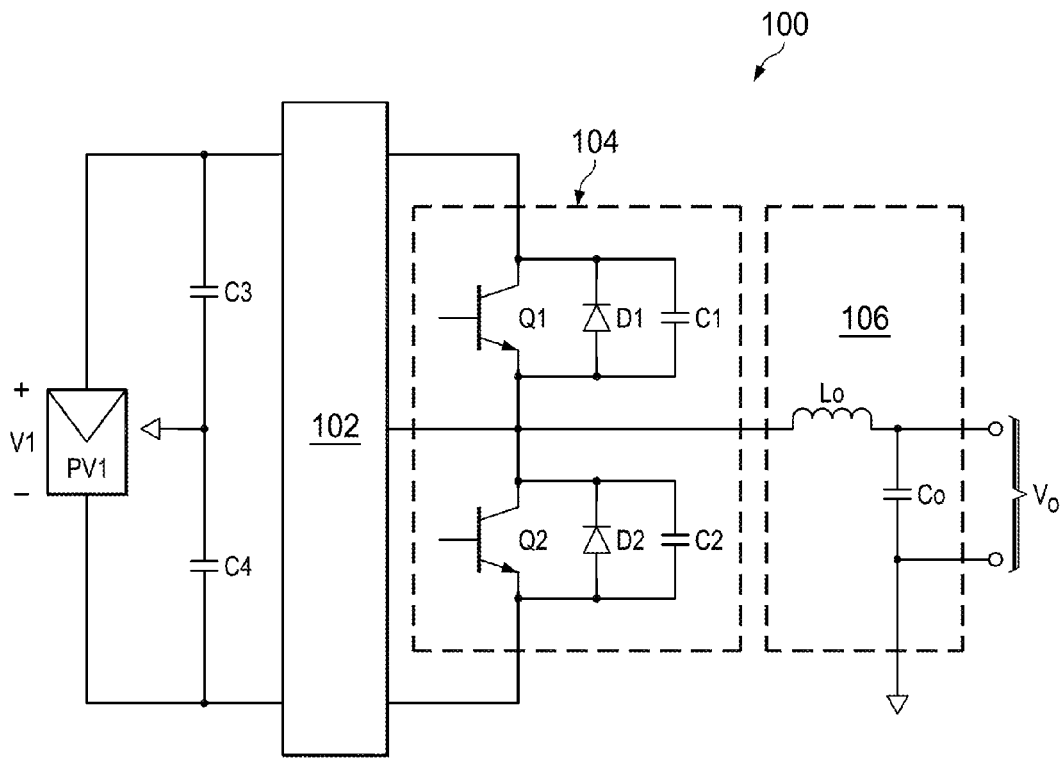
FIG. 1 illustrates a block diagram of a soft switching inverter system in accordance with various embodiments of the present disclosure.

FIG. 1 illustrates a block diagram of a soft switching inverter system in accordance with various embodiments of the present disclosure. The soft switching inverter system 100 comprises a dc source PV1, a soft switching network 102, a main switching network 104 formed by switches Q1 and Q2 and an output filter 106. As shown in FIG. 1, the soft switching network 102, the main switching network 104 and the output filter 106 are connected in cascade and coupled between the dc source PV1 and the output voltage Vo of the soft switching inverter system 100.

The dc source PV1 shown in FIG. 1 may be implemented as a solar panel. More particularly, in some embodiments, while FIG. 1 illustrate a single dc source PV1, the dc source PV1 may comprise a plurality of solar panels connected in series, in parallel, any combinations thereof and the like.

Two input capacitors C3 and C4 are connected in series. As shown in FIG. 1, the series-connected input capacitors C3 and C4 are coupled to the output terminals of the dc source PV1. In some embodiments, the common node of the input capacitors C3 and C4 is connected to ground as shown in FIG. 1.

The output filter 106 is formed by an inductor Lo and a capacitor Co. The output filter 106 helps to filter the multi-level PWM voltage (voltage at the input of the output filter 106) to obtain a sinusoidal waveform at the output of the output filter 106.

The main switching network is formed by switches Q1 and Q2. As shown in FIG. 1, the input of the output filter 106 is coupled to the common node of the switches Q1 and Q2. In some embodiments, the switches Q1 and Q2 may be coupled to the positive input bus and the negative input bus of the dc source PV1 respectively.

In accordance with an embodiment, the switches (e.g., switch Q1) may be an insulated gate bipolar transistor (IGBT) device. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

It should be noted that diode D1 and capacitor C1 may be implemented as external components connected in parallel with the switch Q1. Likewise, diode D2 and capacitor C2 are external components connected in parallel with the switch Q2. Alternatively, if Q1 and Q2 are implemented as MOSFETs, the body diodes and drain-to-source capacitances of Q1 and Q2 may be used to replace the corresponding external components.

FIG. 1 further illustrates the soft switching network 102. As shown in FIG. 1, the soft switching network 102 is coupled between the input capacitors and the main switching network 104. The soft switching network 102 may function as a zero voltage switching unit. Such a zero voltage switching unit helps to achieve a zero voltage transition across the switches (e.g., switch Q1). As such, the power losses of the switches Q1 and Q2 as well as the inverter system may be reduced accordingly. The detailed operation of the soft switching network 102 will be described below with respect to FIGS. 2-5.

Figure 1A:
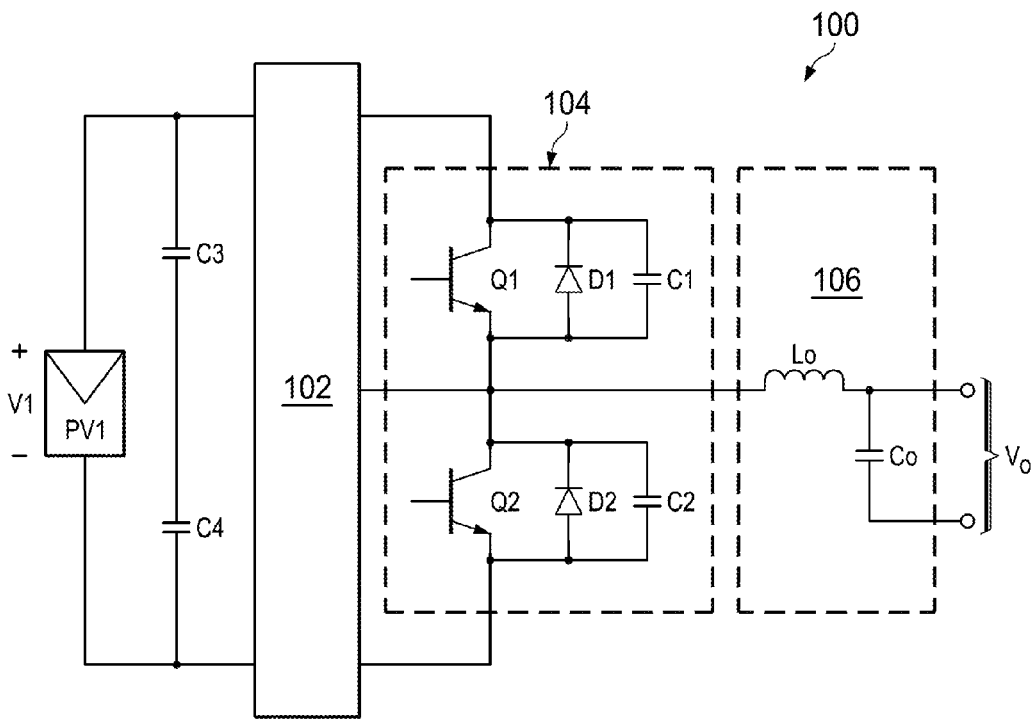
FIG. 1A illustrates a block diagram of a soft switching inverter system in accordance with another embodiment of the present disclosure.

FIG. 1A illustrates a block diagram of a soft switching inverter system in accordance with another embodiment of the present disclosure. The soft switching inverter system shown in FIG. 1A is similar to that shown in FIG. 1 except that the soft switching inverter system shown in FIG. 1A does not comprise a grounding symbol. The configuration shown in FIG. 1A may be used in a 3-phase/3-wire system. On the other hand, the grounding symbol shown in FIG. 1 may be interpreted as ground or a neutral line. Under this interpretation, the configuration shown in FIG. 1 may be used in a 3-phase/4-wire system. It should be noted the configuration shown in FIG. 1 may be used in a 3-phase/3-wire system when the grounding symbol is interpreted as a same voltage potential.

Figure 2:
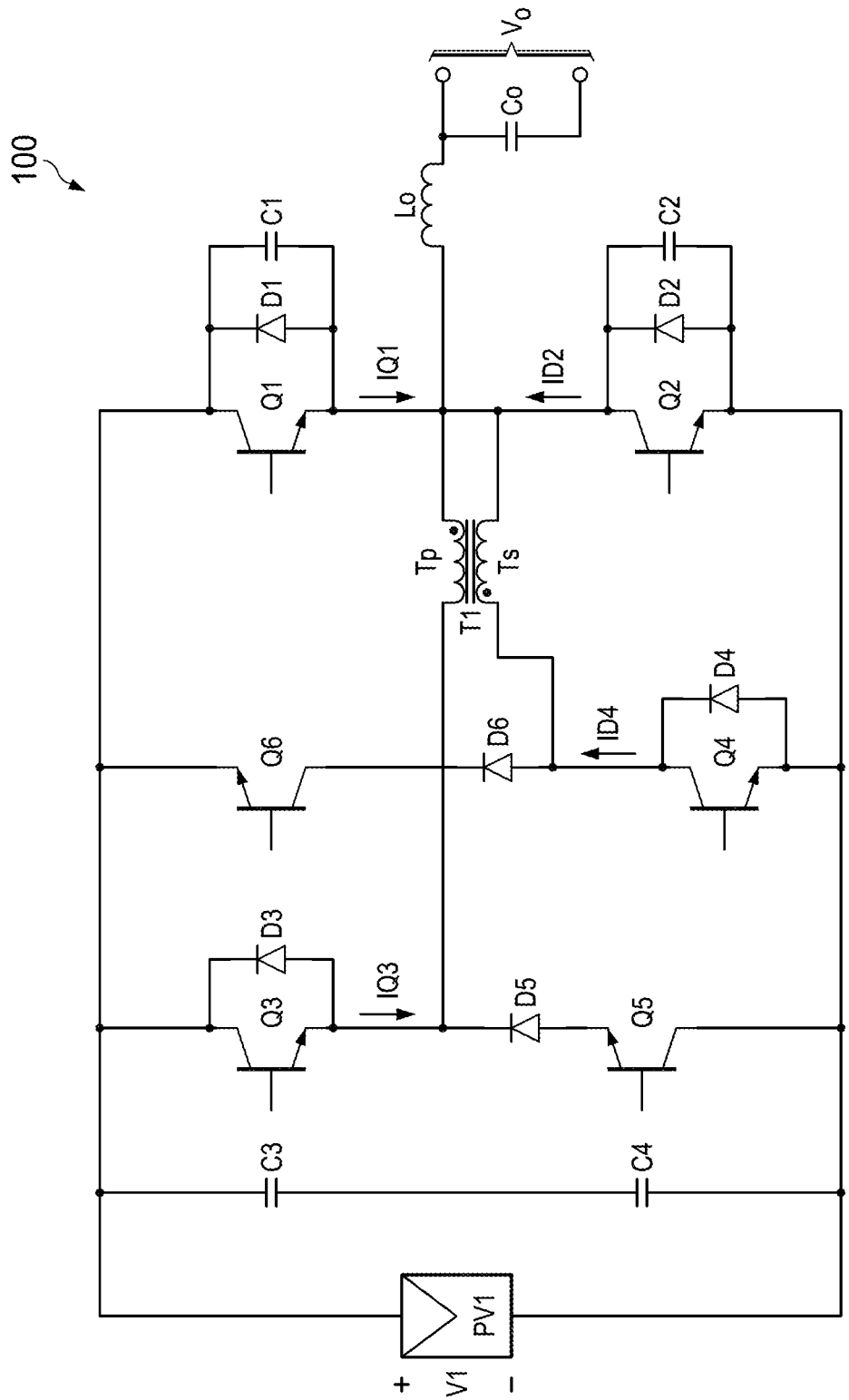
FIG. 2 illustrates a schematic diagram of the soft switching inverter system shown in FIG. 1 when the soft switching inverter system operates in a first half-cycle in accordance with various embodiments of the present disclosure.

FIG. 2 illustrates a schematic diagram of the soft switching inverter system shown in FIG. 1 when the soft switching inverter system operates in a first half-cycle in accordance with various embodiments of the present disclosure. The soft switching network 102 includes two legs. As shown in FIG. 2, a first leg comprises Q3, D5 and Q5 connected in series. A second leg comprises Q6, D6 and Q4 connected in series. These two legs are coupled to the output filter through a transformer T1. More particularly, the common node of Q3 and D5 is connected to the input of the output filter through a primary winding Tp of the transformer T1. The common node of Q4 and D6 is connected to the input of the output filter through a secondary winding Ts of the transformer T1.

The transformer T1's polarities are indicated in FIG. 2 as dots next to the terminals of the primary winding Tp and the second winding Ts. In particular, the transformer T1 has polarity dots at opposing terminals of the primary winding Tp and the secondary winding Ts. Such a polarity dot arrangement indicates the currents flowing through two windings are instantaneously out-of-phase with respect to a common ground. In other words, the dot notation indicates the primary side Tp and the secondary side Ts are out of phase by 180 degrees. The operation of a transformer is well known in the art, and hence is not discussed in further detail herein.

In some embodiments, Q3 functions as a first soft switching auxiliary switch. In particular, Q3 helps Q1 achieve zero voltage switching. The detailed zero voltage switching process of Q1 will be described below with respect to FIG. 3. Likewise, Q4 functions as a second soft switching auxiliary switch. In particular, Q4 helps Q2 achieve zero voltage switching. The detailed zero voltage switching process of Q2 will be described below with respect to FIG. 5.

In some embodiments, D5 and Q5 form a first freewheeling route connected between the primary winding Tp and ground. In some embodiments, the first freewheeling route may provide a conductive path for the current flowing through the primary winding Tp after Q3 is turned off.

Likewise, the diode D6 and the switch Q6 may form a second freewheeling route connected between the second winding Ts and ground. In some embodiments, the second freewheeling route may provide a conductive path for the current flowing in the secondary winding Ts after Q4 is turned off.

It should be noted that in the first half-cycle of Vo, Q5 is always on and Q6 is always off. In the second half-cycle of Vo, Q5 is always off and Q6 is always on. As such, in the first half-cycle, Q6 and D6 form a back-to-back connected device, which prevent a short circuit across the secondary winding Ts. More particularly, in the first half-cycle, Q1 may be turned on. Without having a turned-off Q6, Q1 and D6 may form a conductive path so as to cause a short circuit across the secondary winding Ts.

Likewise, in the second half-cycle, Q5 and D5 form a back-to-back connected device, which prevent a short circuit across the primary winding Tp. More particularly, in the second half-cycle, Q2 may be turned on. Without having a turned-off Q5, Q2 and D5 may form a conductive path so as to cause a short circuit across the primary winding Tp.

It should further be noted that the schematic diagram of the freewheeling routes described above is merely an exemplary structure and is not meant to limit the current embodiments. One of ordinary skill in the art would recognize many variations, alternatives, and modifications. For example, the diodes D5 and D6 may be replaced by two switches respectively. In addition, while FIG. 2 illustrates that switches Q5 and Q6 may be implemented as IGBT transistors, the switches Q5 and Q6 can be any controllable switches such as MOSFET devices, IGCT devices, GTO devices, SCR devices, JFET devices, MCT devices, any combinations thereof and/or the like.

As shown in FIG. 2, the current flowing through the switch Q1 is referred to as IQ1. Likewise, the current flowing through the auxiliary switch Q3 is referred to as IQ3. The current flowing through the diode D2 is referred to as ID2. The current flowing through the diode D4 is referred to as ID4.

Figure 3:
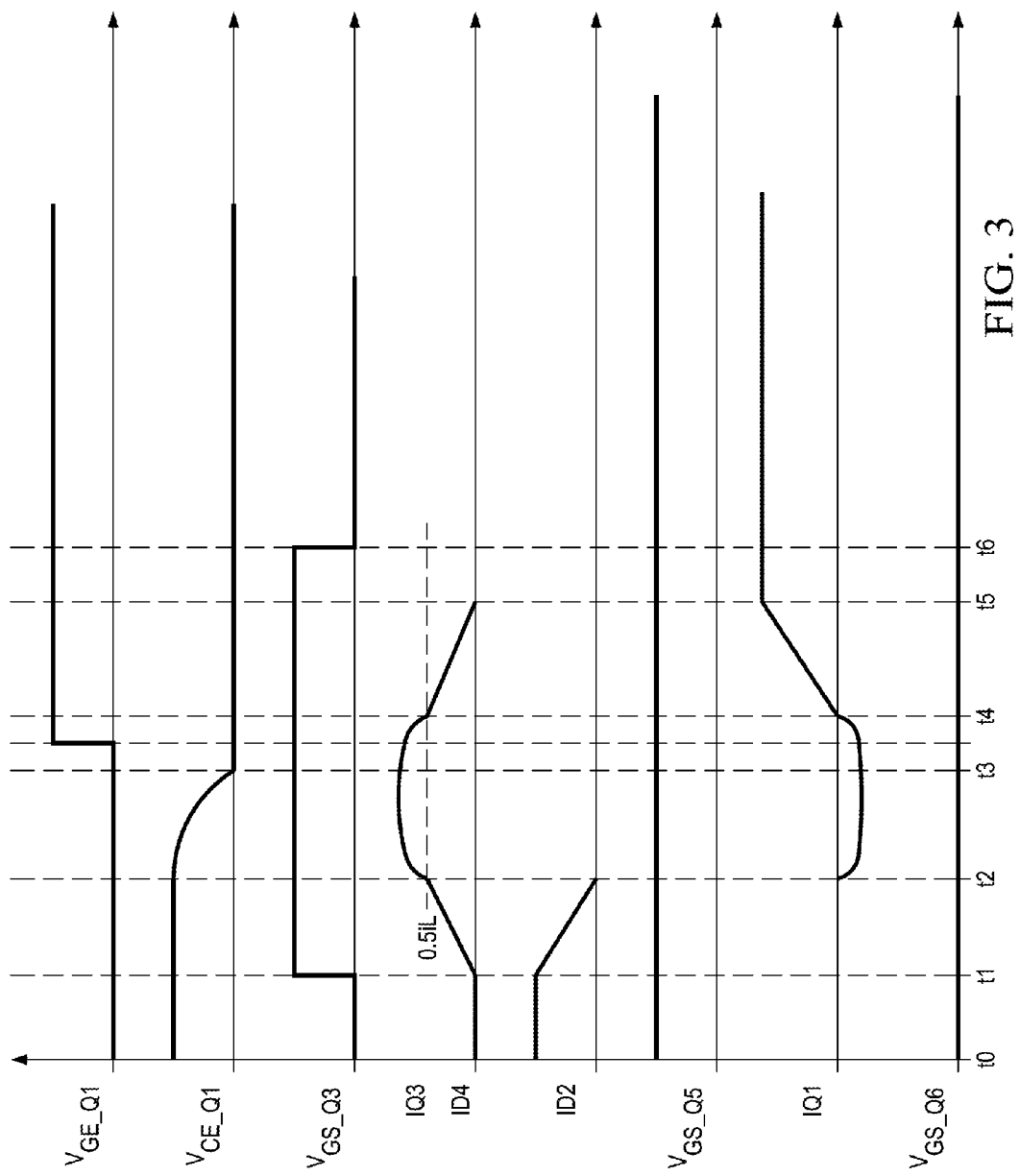
FIG. 3 illustrates a timing diagram of various signals in the soft switching inverter system shown in FIG. 2 in accordance with various embodiments of the present disclosure.

FIG. 3 illustrates a timing diagram of various signals in the soft switching inverter system shown in FIG. 2 in accordance with various embodiments of the present disclosure. Referring back to FIG. 2, the switch Q1 is implemented as an IGBT device and the auxiliary switch Q3 is implemented as a MOSFET device or an IGBT device. As such, the voltage across the switch Q1 is referred to as $V_{CE\_Q1}$. The gate-to-emitter voltage of the switch Q1 is referred to as $V_{GE\_Q1}$. The gate-to-source voltage of the auxiliary switch Q3 is referred to as $V_{GS\_Q3}$. The gate-to-source voltage of the auxiliary switch Q5 is referred to as $V_{GS\_Q5}$. The gate-to-source voltage of the auxiliary switch Q6 is referred to as $V_{GS\_Q6}$. The current flowing through the inductor of the output filter is referred to as IL (a.k.a. load current).

During the time interval from t0 to t1, switch Q1 is turned off. The auxiliary switch Q3 is turned off. At the time instant t1, the auxiliary switch Q3 is turned on in response to a voltage applied to the gate of the auxiliary switch Q3. The current flowing into the auxiliary switch Q3 may not change instantaneously since the auxiliary switch Q3 is connected in series with the primary side Tp of transformer T1. As shown in FIG. 3, the current IQ3 ramps up from zero to a value of about one half of IL at the time instant t2. The ramp-up slope exhibits an approximately linear behavior as shown in FIG. 3.

During the time interval from t1 to t2, the current flowing through the diode D4 may ramp up in proportional to the increase of the current flowing through the auxiliary switch Q3 since currents ID4 and IQ3 are the secondary current and the primary current of the transformer T1 respectively. At the time instant t2, the sum of currents ID4 and IQ3 may be equal to the load current IL. Because the load current is the sum of currents ID4 and IQ3, the current flowing through the diode ID2 drops to approximately zero.

During the time interval from t2 to t3, the currents ID4 and IQ3 increase through a resonant process formed by the leakage inductance of the transformer T1 and C1. Since the sum of the currents ID4 and IQ3 is greater than the load current IL, IQ1 may be of a negative current to offset the increases of the currents IQ3 and ID4 so that the load current IL is kept constant. Furthermore, as a consequence of such a negative current flowing through the switch Q1, the voltage $V_{CE\_Q1}$ across the switch Q1 may be discharged accordingly during the time interval from t2 to t3.

During the discharge process described above, the output capacitor of the switch Q1, the leakage inductance of the transformer T1 may form an L-C resonant process. Such an L-C resonant process may lead to a current decrease after the current IQ3 reaches its peak value at the time instant t3. Since the current ID4 is a current flowing through the secondary side of the transformer T1, the current ID4 drops in response to the decrease of the current IQ3 as shown in FIG. 3.

During the time internal from t3 to t4, the sum of the currents IQ3 and ID4 is still greater than the load current IL. Therefore, the current IQ1 is still a negative current as shown in FIG. 3. At the time instant t3, the voltage $V_{CE\_Q1}$ is of a voltage level approximately equal to zero. The switch Q1 may be turned on at this time instant so that the switch Q1 may achieve zero voltage switching.

It should be noted that the time instant at which the switch Q1 is turned on shown in FIG. 3 is merely an example. The switch Q1 may be of a zero voltage transition if the switch Q1 is turned on at any time instant during a time interval from t3 to t4. At the time instant t4, the sum of the currents IQ3 and ID4 is less than the load current IL. As a result, even if the switch Q1 is not turned on, the current IQ1 may change from a negative current to a positive current so as to maintain the load current IL constant. Such a positive current IQ1 may charge the output capacitor of the switch Q1. As a result, the voltage across the switch Q1 may increase. Therefore, a zero voltage turn-on of the switch Q1 may occur in a time interval from t3 to t4. After the current IQ1 changes from a negative current to a positive current, the switch Q1 may not achieve zero voltage switching.

After the switch Q1 is turned on, the primary side Tp (shown in FIG. 2) of the transformer T1 may be shorted by a conductive path formed by switches Q1 and Q3. In response to the increase of the current IQ1, currents IQ3 and ID4 drop accordingly. At the time instant t5, both current IQ3 and current ID4 drop to zero as shown in FIG. 3. The auxiliary switch Q3 may be turned off after the currents IQ3 and ID4 drop to zero. As shown in FIG. 3, the auxiliary switch Q3 is turned off at the time instant t6.

One advantageous feature of the soft switching network is that the switch Q1 may achieve a zero voltage turn-on and the auxiliary switches (e.g., Q3) are of a zero current turn-off. Such zero voltage switching and zero current switching help to reduce the total power losses of the soft switching inverter system 100 shown in FIG. 2.

Figure 4:
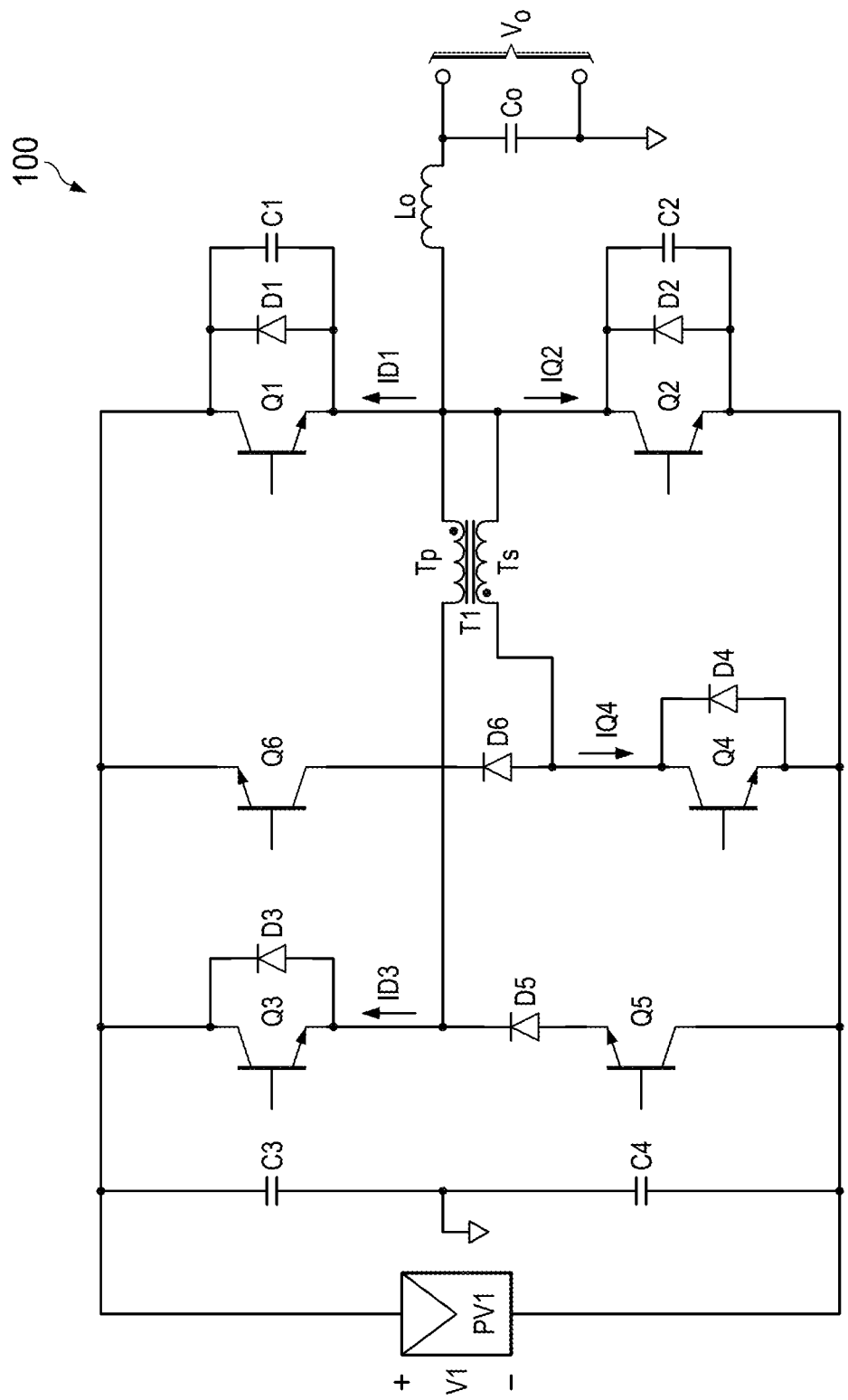
FIG. 4 illustrates a schematic diagram of the soft switching inverter system shown in FIG. 1 when the soft switching inverter system operates in a second half-cycle in accordance with various embodiments of the present disclosure.

FIG. 4 illustrates a schematic diagram of the soft switching inverter system shown in FIG. 1 when the soft switching inverter system operates in a second half-cycle in accordance with various embodiments of the present disclosure. The schematic diagram shown in FIG. 4 is similar to that shown in FIG. 2, and hence is not described in detail to avoid unnecessary repetition.

As shown in FIG. 4, the current flowing through the switch Q2 is referred to as IQ2. Likewise, the current flowing through the auxiliary switch Q4 is referred to as IQ4. The current flowing through the diode D1 is referred to as ID1. The current flowing through the diode D3 is referred to as ID3.

Figure 5:
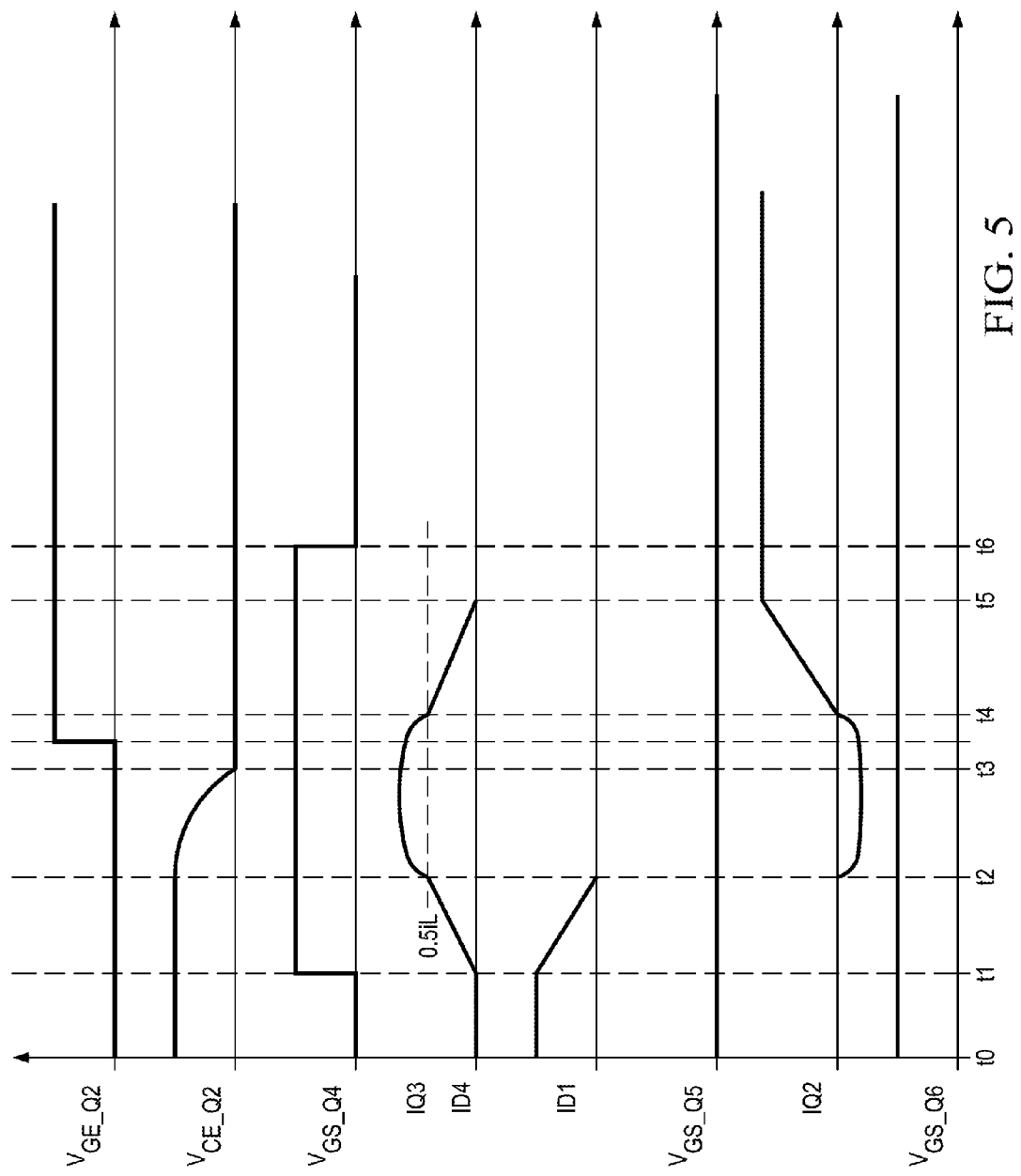
FIG. 5 illustrates a timing diagram of various signals in the soft switching inverter system shown in FIG. 4 in accordance with various embodiments of the present disclosure.

FIG. 5 illustrates a timing diagram of various signals in the soft switching inverter system shown in FIG. 4 in accordance with various embodiments of the present disclosure. The timing diagram shown in FIG. 5 is similar to that shown in FIG. 3, and hence is not discussed in further detail.

One advantageous feature of the soft switching network is that the switch Q2 may achieve a zero voltage turn-on and the auxiliary switches (e.g., Q4) are of a zero current turn-off. Such zero voltage switching and zero current switching help to reduce the total power losses of the soft switching inverter system 100 shown in FIG. 4.

Figure 6:
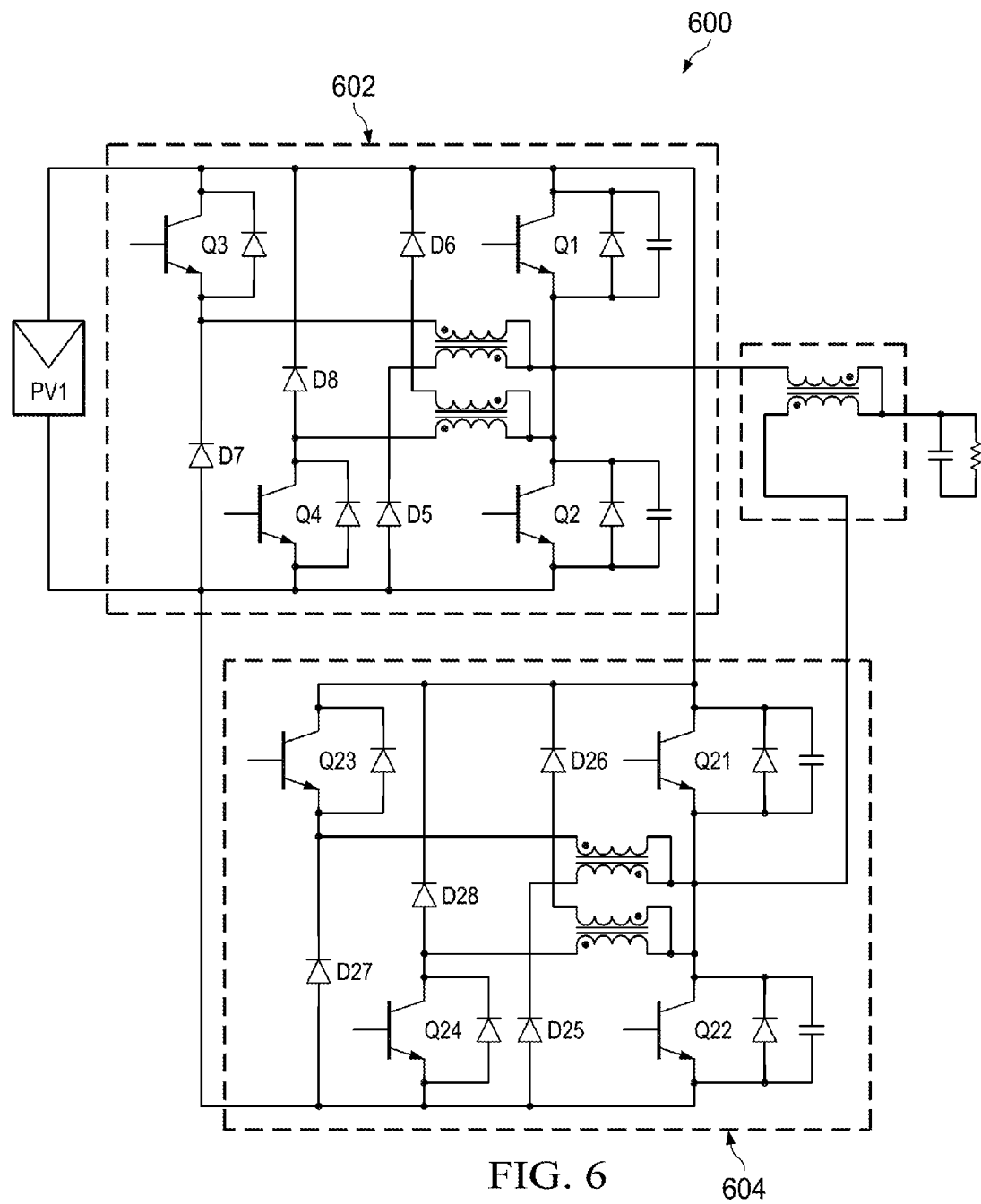
FIG. 6 illustrates a schematic diagram of a first illustrative embodiment of a system comprising the soft switching network shown in accordance with various embodiments of the present disclosure.

FIG. 6 illustrates a schematic diagram of a first illustrative embodiment of a system comprising the soft switching network shown in accordance with various embodiments of the present disclosure. There may be two soft switching inverter systems 602 and 604 shown in FIG. 6. The zero voltage switching process of each soft switching inverter system is similar to the soft switching inverter system 100 shown in FIGS. 2 and 4 except that the soft switching networks may have one additional transformer. The additional transformer helps to simplify the structure of the freewheeling apparatus. In comparison with the freewheeling apparatus shown in FIG. 2, the freewheeling apparatus shown in FIG. 6 includes one diode (e.g., D7) rather than a diode and a switch connected in series. In addition, soft switching inverter systems 602 and 604 are connected in parallel.

FIG. 6 further illustrates a coupled output choke in a dashed box. Such a coupled output choke helps two soft switching inverter systems 602 and 604 achieve interleaving operation.

Figure 7:
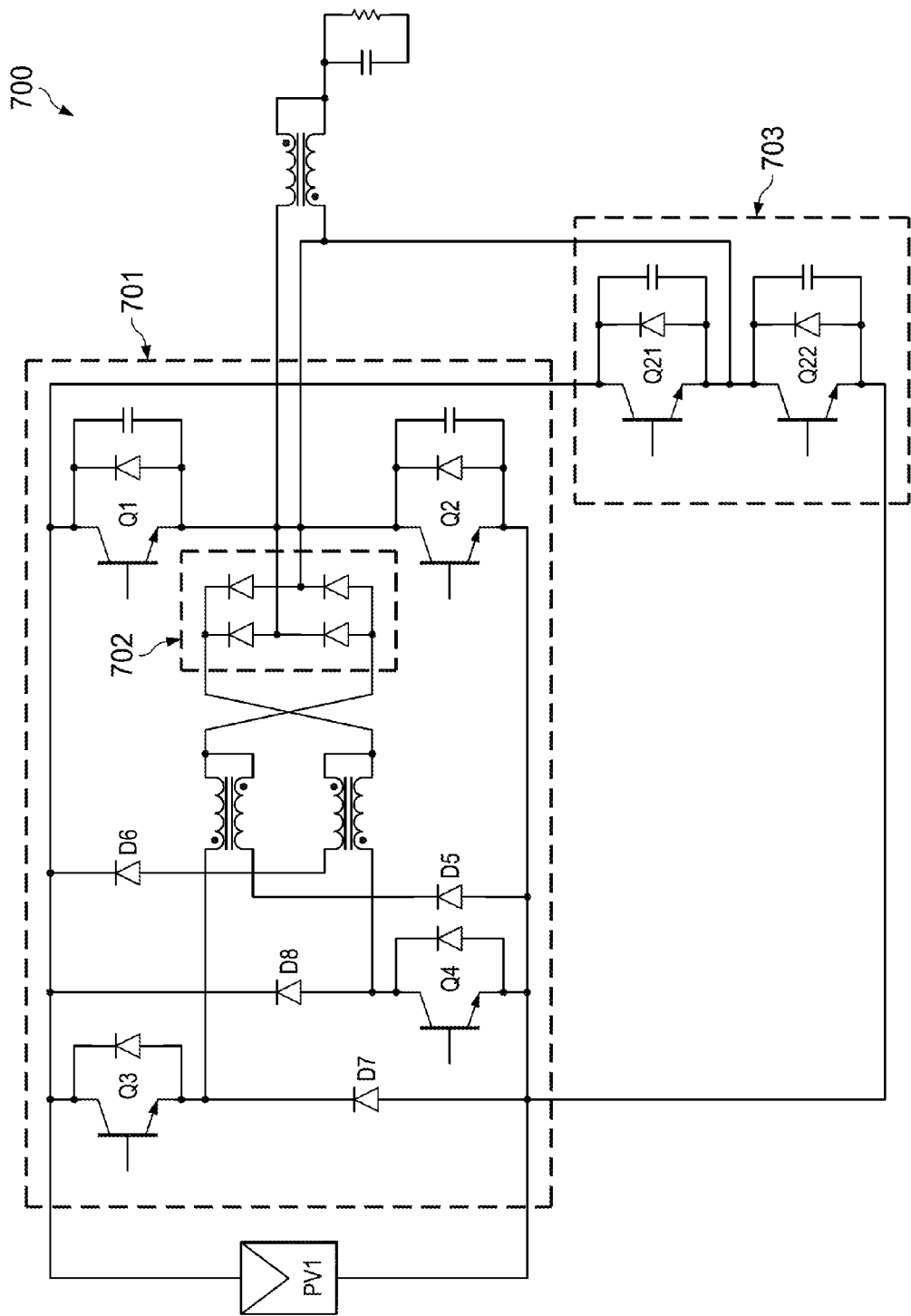
FIG. 7 illustrates a schematic diagram of a second illustrative embodiment of a system comprising the soft switching network shown in accordance with various embodiments of the present disclosure.

FIG. 7 illustrates a schematic diagram of a second illustrative embodiment of a system comprising the soft switching network shown in accordance with various embodiments of the present disclosure. There may be two soft switching inverter systems shown in FIG. 7. The schematic of the soft switching inverter system 701 is similar to that of the soft switching inverter 602 shown in FIG. 6, and hence is not discussed in further detail.

The soft switching inverter system 703 only includes two main switches Q21 and Q22. As shown in FIG. 7, the main switches Q1 and Q2 are connected in parallel with the main switches Q21 and Q22 through a rectifier 702. The function and operating principle of a rectifier formed by four diodes are well known, and hence are not discussed in further detail to avoid repetition.

Figure 8:
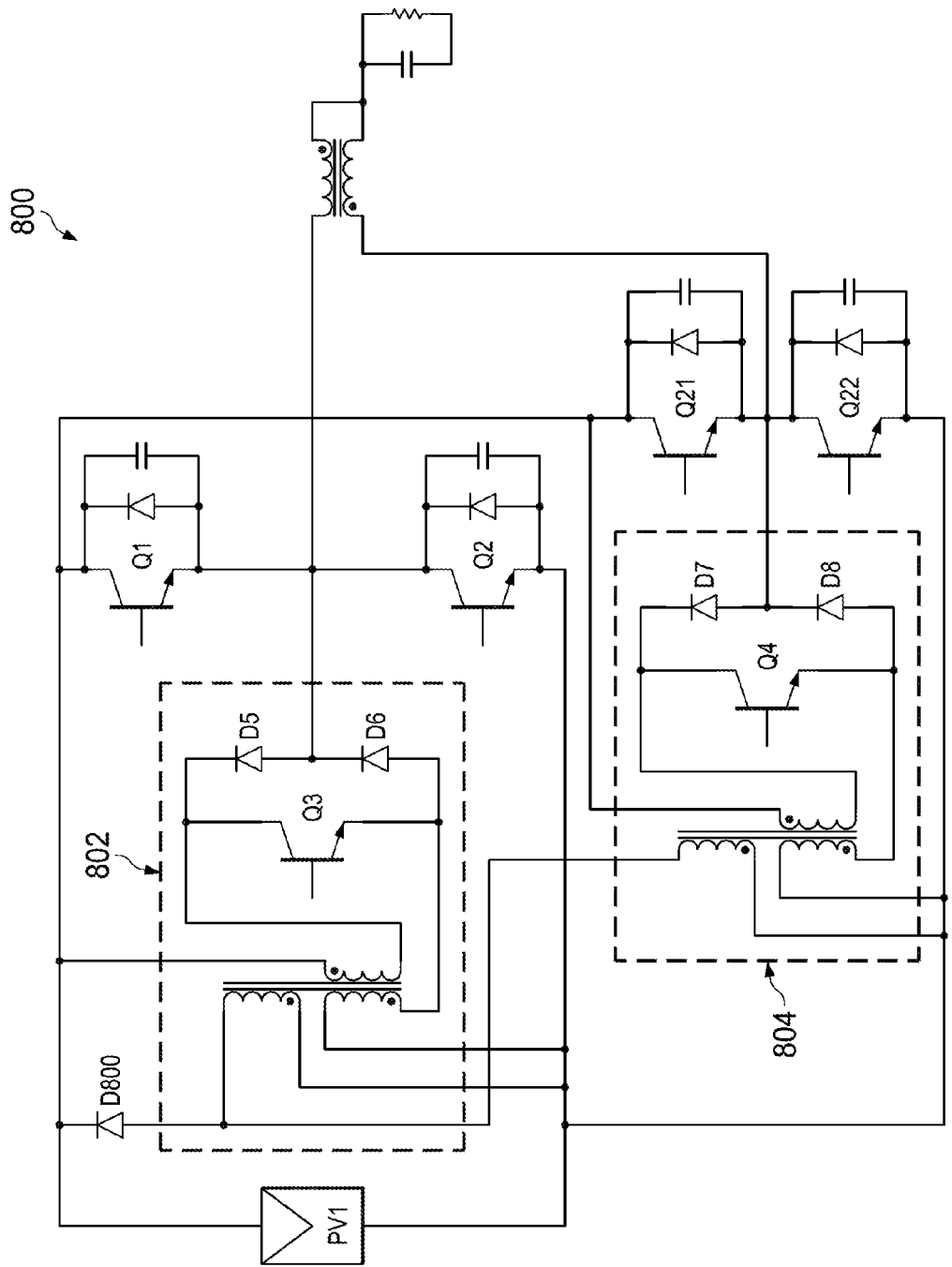
FIG. 8 illustrates a schematic diagram of a third illustrative embodiment of a system comprising the soft switching network shown in accordance with various embodiments of the present disclosure.

FIG. 8 illustrates a schematic diagram of a third illustrative embodiment of a system comprising the soft switching network shown in accordance with various embodiments of the present disclosure. There may be two soft switching inverter systems 802 and 804 as shown in FIG. 8. More particularly, these two soft switching inverter systems 802 and 804 share a diode D800.

Figure 9:
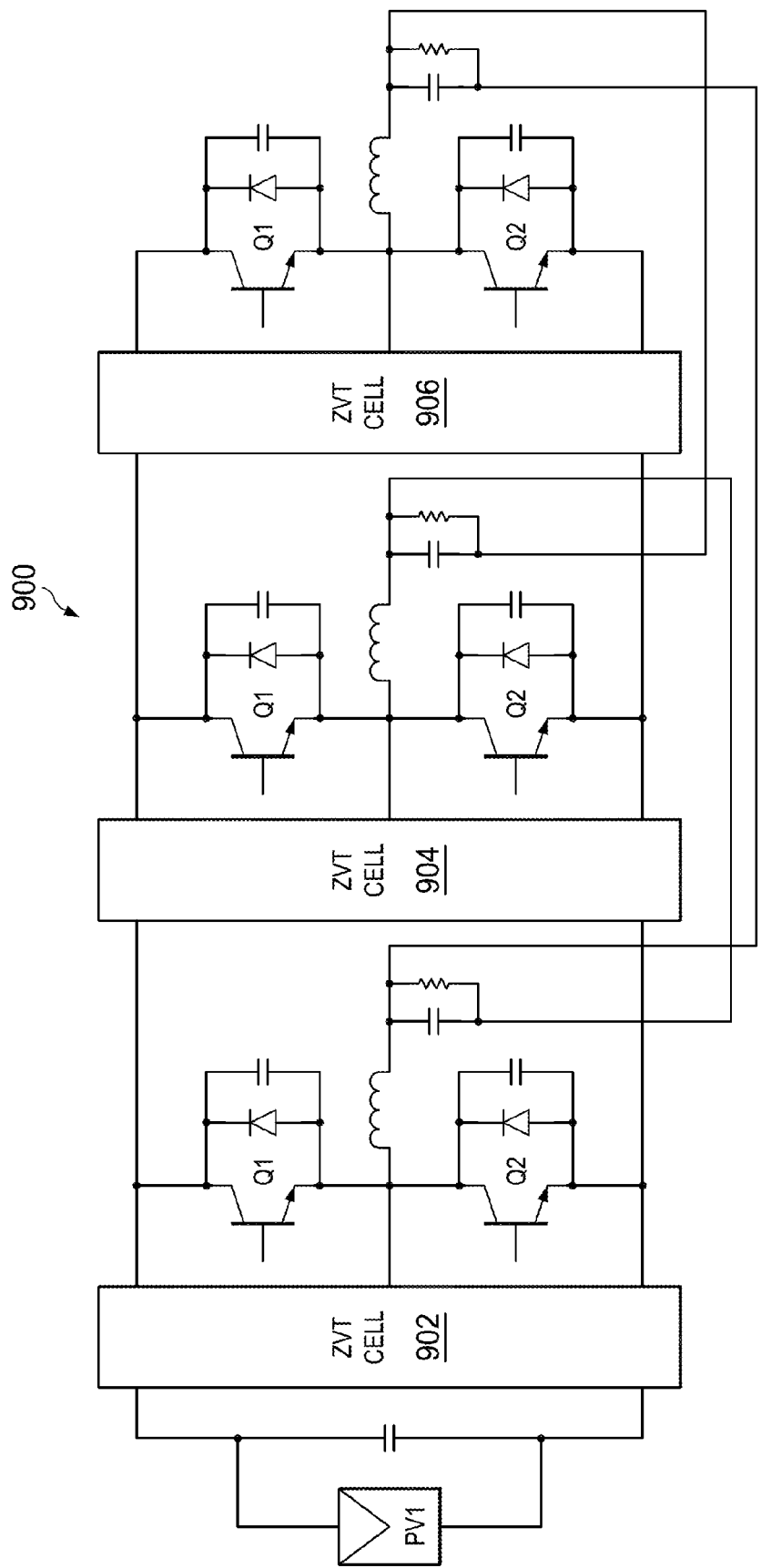
FIG. 9 illustrates a block diagram of a three-phase soft switching inverter system in accordance with various embodiments of the present disclosure.

FIG. 9 illustrates a block diagram of a three-phase soft switching inverter system in accordance with various embodiments of the present disclosure. Each phase of the three-phase multilevel inverter may employ a soft switching inverter. The soft switching inverters 902, 904 and 906 may be of a topology of those described above with respect to FIGS. 2, 4 and 7-9.

As shown in FIG. 9, each phase of the three-phase inverter shares a common positive dc input (e.g., a first terminal of the dc source PV1), a common negative dc input (e.g., a second terminal of the dc source PV1) and ground. The outputs of the three phases form a delta connected three phase system as shown in FIG. 9.

Figure 10:
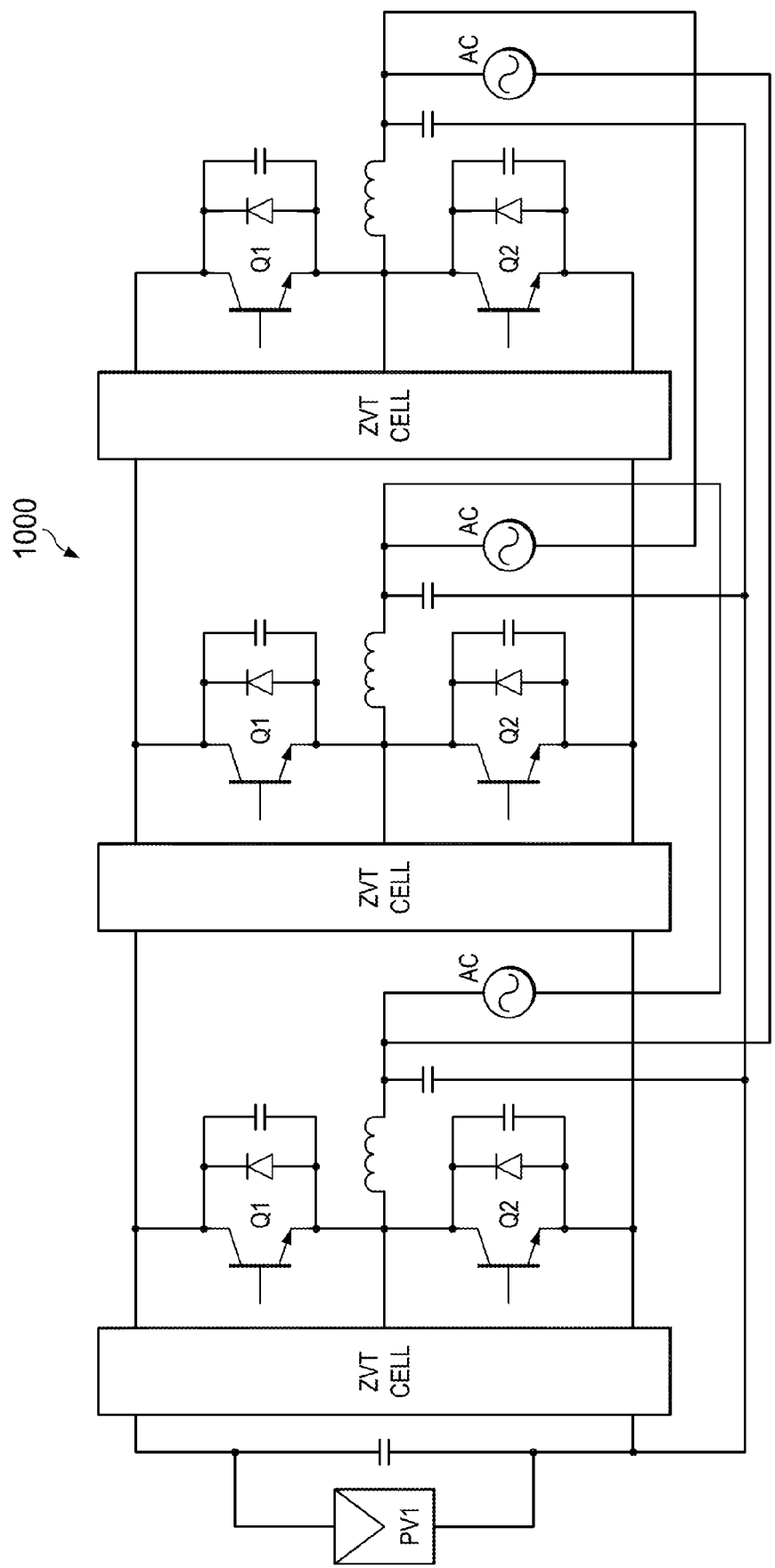
FIG. 10 illustrates a block diagram of a three-phase soft switching inverter system in accordance with another embodiment of the present disclosure.

FIG. 10 illustrates a block diagram of a three-phase soft switching inverter system in accordance with another embodiment of the present disclosure. The three-phase inverter shown in FIG. 10 is similar to that shown in FIG. 9 except that one terminal of the output capacitor of each phase is coupled to one terminal of the capacitor of PV1 through a connection line. In some embodiments, the connection line may be coupled to ground, a neutral line and/or an internal line.

Figure 11:
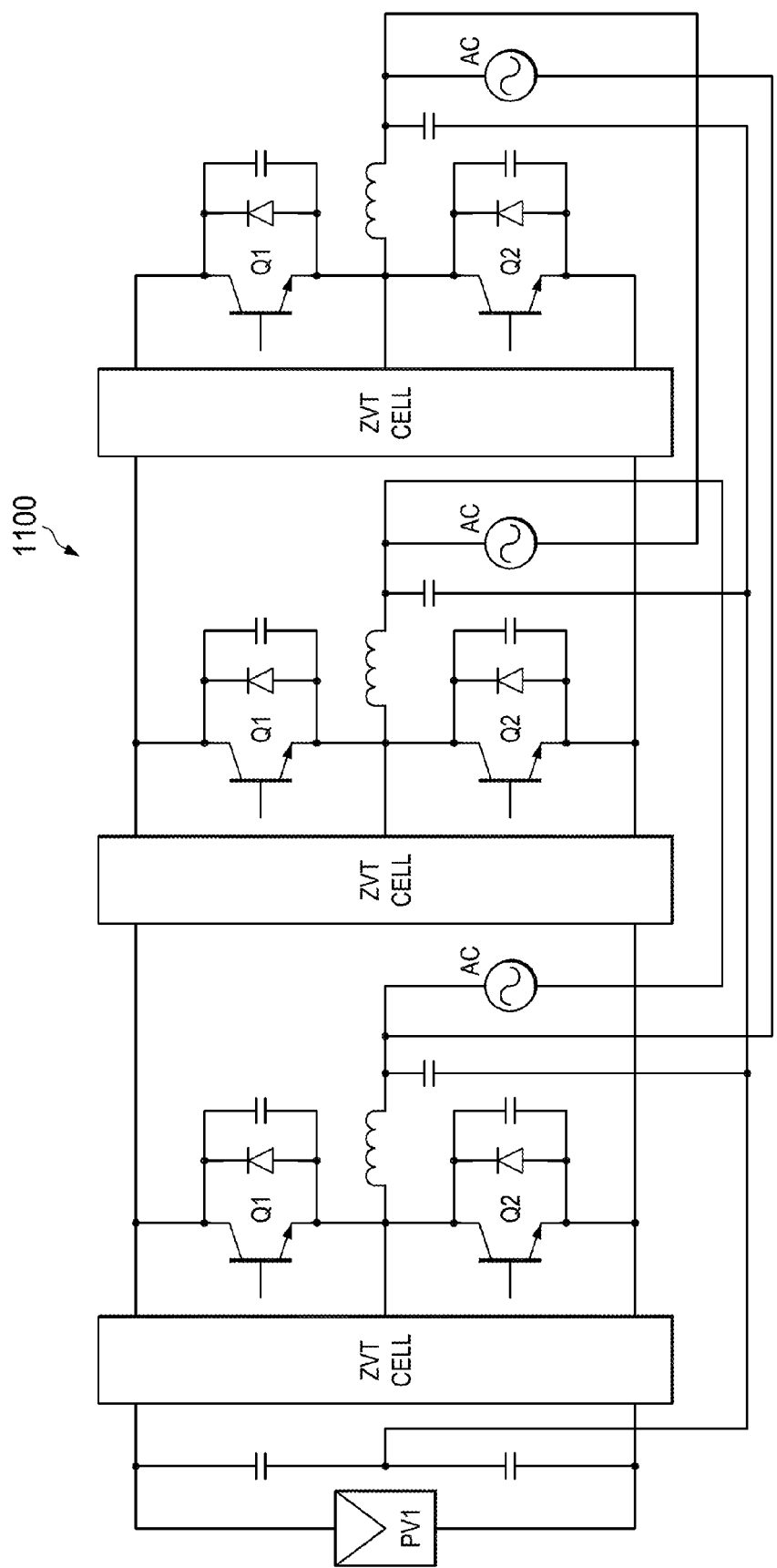
FIG. 11 illustrates a block diagram of a three-phase soft switching inverter system in accordance with yet another embodiment of the present disclosure.

FIG. 11 illustrates a block diagram of a three-phase soft switching inverter system in accordance with yet another embodiment of the present disclosure. The three-phase inverter shown in FIG. 11 is similar to that shown in FIG. 10 except that one terminal of the output capacitor of each phase is coupled to a common node of two capacitors at the output of PV1 through a connection line. In some embodiments, the connection line may be coupled to ground, a neutral line and/or an internal line.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An inverter comprising:
a first switch coupled to an input of an output filter and a positive dc bus;
a second switch coupled to the input of the output filter and a negative dc bus;
a transformer coupled to a common node of the first switch and the second switch;
a first freewheeling apparatus and a first soft switching switch connected in series between the positive bus and the negative bus, wherein the first freewheeling apparatus comprises a first freewheeling diode and a first freewheeling switch connected in series, and the first soft switching switch is configured such that the first switch is of a first zero voltage transition during a turn-on process of the first switch; and
a second freewheeling apparatus and a second soft switching switch connected in series between the positive bus and the negative bus, wherein the second freewheeling apparatus comprises a second freewheeling diode and a second freewheeling switch connected in series, and the second soft switching switch is configured such that the second switch is of a second zero voltage transition during a turn-on process of the second switch.

2. The inverter of claim 1, further comprising:
a first input capacitor and a second input capacitor connected in series and further coupled between the positive dc bus and the negative dc bus.

3. The inverter of claim 2, wherein:
a common node of the first input capacitor and the second input capacitor is connected to ground.

4. The inverter of claim 1, wherein:
the first freewheeling switch is configured to be turned on during a first half-cycle of a voltage at an output of the output filter and be turned off during a second half-cycle of the voltage at the output of the output filter; and
the second freewheeling switch is configured to be turned on during the second half-cycle of the voltage at the output of the output filter and be turned off during the first half-cycle of the voltage at the output of the output filter.

5. The inverter of claim 1, wherein:
the transformer has a primary winding and a secondary winding, and wherein the primary winding and the secondary winding are out of phase from each other.

6. The inverter of claim 5, wherein:
a first terminal of the primary winding is coupled to a common node of the first freewheeling apparatus and the first soft switching switch;
a second terminal of the primary winding is coupled to a common node of the first switch and the second switch;
a first terminal of the second winding is coupled to a common node of the second freewheeling apparatus and the second soft switching switch; and
a second terminal of the second winding is coupled to the common node of the first switch and the second switch, and wherein:
the second terminal of the primary winding and the first terminal of the second winding are of a same polarity.

7. An apparatus comprising:
a soft switching network coupled to a power converter, wherein the power converter comprises a first switch, a second switch and an output filter formed by an inductor and a capacitor, and wherein the soft switching network comprises:
a magnetic device, a first auxiliary switch, a second auxiliary switch, a first freewheeling apparatus and a second freewheeling apparatus, wherein the first freewheeling apparatus comprises a first freewheeling diode and a first freewheeling switch connected in series, the second freewheeling apparatus comprises a second freewheeling diode and a second freewheeling switch connected in series, and
wherein the soft switching network is configured such that:
the first switch is of zero voltage switching;
the second switch is of zero voltage switching;
the first auxiliary switch is of zero current switching; and
the second auxiliary switch is of zero current switching.

8. The apparatus of claim 7, wherein:
the power converter is an inverter coupled to a dc source.

9. The apparatus of claim 7, wherein:
the first switch and the second switch are selected from the group consisting of an insulated gate bipolar transistor (IGBT) device, a metal oxide semiconductor field-effect transistor (MOSFET) device, an integrated gate commutated thyristor (IGCT) device, a gate turn-off thyristor (GTO) device, a silicon controlled rectifier (SCR) device, a junction gate field-effect transistor (JFET) device, a MOS controlled thyristor (MCT) device and any combinations thereof.

10. The apparatus of claim 7, wherein the magnetic device is a transformer having:
a first terminal coupled to a common node of the first auxiliary switch and the first freewheeling apparatus;
a second terminal coupled to an input of the output filter;
a third terminal coupled to a common node of the second auxiliary switch and the second freewheeling apparatus; and a fourth terminal coupled to the second terminal, wherein the third terminal and the second terminal share a same polarity.

11. The apparatus of claim 7, wherein:
the first switch and the second switch are connected in series, and wherein the common node of the first switch and the second switch is connected to the second terminal and the fourth terminal of the transformer.

12. The apparatus of claim 7, wherein:
the first freewheeling switch is configured to be turned on during a first half-cycle of a voltage at an output of the output filter and be turned off during a second half-cycle of the voltage at the output of the output filter, and
the first freewheeling switch is configured to be turned on during the second half-cycle of the voltage at the output of the output filter and be turned off during the first half-cycle of the voltage at the output of the output filter.

13. A method comprising:
providing a soft switching network coupled to a first main switch, a second main switch an output filter of a power converter, wherein the soft switching network comprises:
a first auxiliary switch;
a first freewheeling apparatus connected in series with the first auxiliary switch, wherein the first freewheeling apparatus comprises a first freewheeling diode and a first freewheeling switch connected in series;
a second auxiliary switch;
a second freewheeling apparatus connected in series with the second auxiliary switch, wherein the second freewheeling apparatus comprises a second freewheeling diode and a second freewheeling switch connected in series; and
a magnetic device coupled to the output filter;
prior to a zero voltage transition of the first main switch, turning on the first auxiliary switch; and
after the zero voltage transition of the first main switch, turning off the first auxiliary switch.

14. The method of claim 13, further comprising:
prior to a zero voltage transition of the second main switch, turning on the second auxiliary switch; and
after the zero voltage transition of the second main switch, turning off the second auxiliary switch.

15. The method of claim 13, wherein:
the magnetic device is a transformer, wherein the transformer has a primary winding and a secondary winding, and wherein the primary winding and the secondary winding are out of phase from each other, and wherein:
a first terminal of the primary winding is coupled to a common node of the first freewheeling apparatus and the first auxiliary switch;
a second terminal of the primary winding is coupled to a common node of the first main switch and the second main switch;
a first terminal of the second winding is coupled to a common node of the second freewheeling apparatus and the second auxiliary switch; and
a second terminal of the second winding is coupled to the common node of the first main switch and the second main switch, and wherein:
the second terminal of the primary winding and the first terminal of the second winding are of a same polarity.

16. The method of claim 15, further comprising:
turning on the first freewheeling apparatus during a first half-cycle of a voltage at an output of the output filter; and
turning off the first freewheeling apparatus during a second half-cycle of the voltage at the output of the output filter.

17. The method of claim 16, further comprising:
turning off the second freewheeling apparatus during the first half-cycle of the voltage at the output of the output filter; and
turning on the second freewheeling apparatus during the first half-cycle of the voltage at the output of the output filter.

18. The method of claim 13, further comprising:
coupling a plurality of input capacitors to a dc input power source, wherein the plurality of input capacitors are connected in series and a common node of the plurality of input capacitors is connected to ground;
coupling the first main switch between the output filter and a first output terminal of the dc input power source;
coupling the second main switch between the output filter and a second output terminal of the dc input power source.

19. An apparatus comprising:
a primary soft switching network coupled to a first switch and a second switch, wherein the primary soft switching network comprises:
a primary transformer,
a primary soft switch, and
a freewheeling apparatus, wherein a winding of the primary transformer is coupled to the freewheeling apparatus;
a secondary soft switching network coupled to a third switch and a fourth switch, wherein the secondary soft switching network comprises:
a secondary transformer, and
a secondary soft switch,
wherein the secondary soft switching network share the freewheeling apparatus with the primary soft switching network by coupling a winding of the secondary transformer to the freewheeling apparatus; and
a tertiary transformer coupled to a output filter, the primary soft switching network and the secondary soft switching network.

20. The apparatus of claim 19, wherein the tertiary transformer coupled to the primary soft switching network further comprising the tertiary transformer coupled to the primary soft switch via diodes.

21. The apparatus of claim 19, wherein the tertiary transformer coupled to the secondary soft switching network further comprising the tertiary transformer coupled to the secondary soft switch via diodes.

* * * * *